Oct. 25, 1927.                                                                1,646,542
                          J. J. KEYSER
ACTUATING DEVICE FOR THE COPS OF SPINNING, TWISTING, AND LIKE MACHINES
                       Filed June 22, 1925
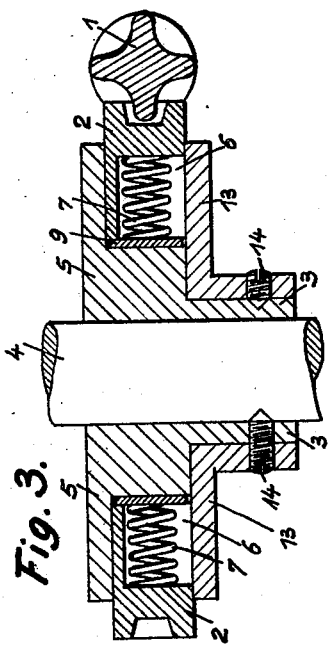
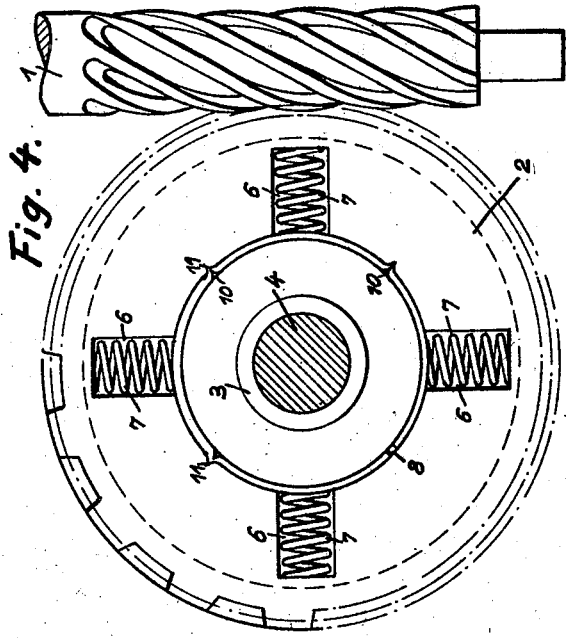
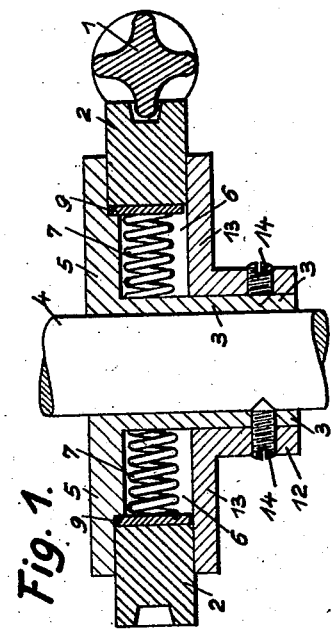
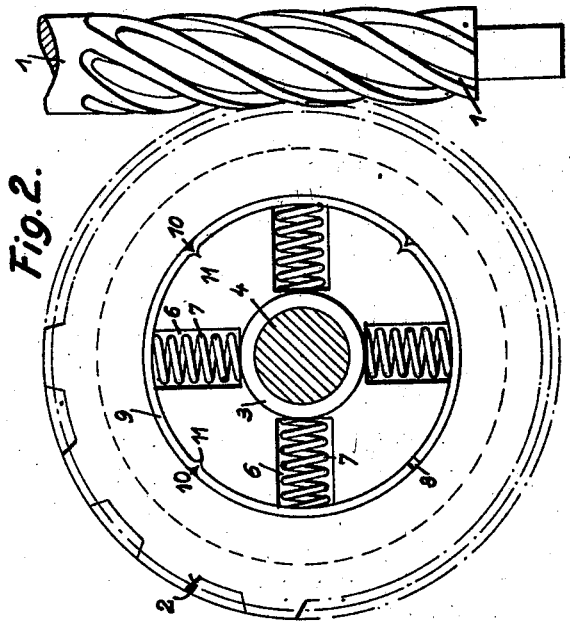
Inventor:
J. J. Keyser Patented Oct. 25, 1927.

1,646,542

UNITED STATES PATENT OFFICE.

JOHANN JACOB KEYSER, OF AARAU, SWITZERLAND.

ACTUATING DEVICE FOR THE COPS OF SPINNING, TWISTING, AND LIKE MACHINES.

Application filed June 22, 1925, Serial No. 38,892, and in Germany April 3, 1925.

This invention is concerned with an actuating device for the cops of spinning, twisting and the like machines.

I know that actuating devices have already been proposed in which the tooth pressure is by the actuation of the gear in a certain direction so transmitted that it is directed against the resiliently springing friction disc. This results in a tilting of the driving gear whereby the teeth of the gear are frequently damaged. In order to do away with this disadvantage I arrange the gear according to this present invention between two stationary or rigid guiding flanges and have it carried around by friction acting at the inner periphery of the bore. To this end I arrange within the gear sleeve rigidly supported by its shaft or within the gear itself radially acting springs imparting immediate pressure or imparting it by means of one or a plurality of pressure members or rings to the adjacent friction surface so that the gear is carried around by friction.

The invention is illustrated in the accompanying drawings in two preferred embodiments.

Fig. 1. is the cross section of an embodiment at which the springs are located within the sleeve.

Fig. 2 is a side view of Fig. 1, the one flange member being omitted for the sake of better clearness.

Figs. 3 and 4 are the corresponding section and side view of an embodiment at which the springs are located within the gear member.

The spindle 1 is actuated by the worm gear 2 loosely mounted on a sleeve 3 of the shaft 4. The sleeve 3 is provided with a flange 5 and, at its central portion, with radial recesses 6 open at one side in order to permit the introduction of the springs 7, even if the worm gear 2 is mounted. The springs 7 are acting against one or a plurality of pressure members engaging at the embodiment Fig. 1 the inner peripheral wall of gear 2 and engaging the outer wall of sleeve 3 according to the embodiment illustrated in Figs. 3 and 4. The pressure members carrying around the gear by friction can be separately arranged for each spring, preferably I arrange a ring 9 slit at one point 8 and having one or a plurality of kerfs 10 engaging with corresponding recesses 11 of the sleeve 3 in order to lock the ring 9 against peripheral shift on the sleeve 3, as this is illustrated in Fig. 2.

The gear 2 is held by a ring 12 having flanges 13 and being itself attached to the sleeve 3 by one or a plurality of threaded bolts 14, one of which may be used for locking the sleeve 3 on the shaft 4.

Instead of locating the springs 7 within the sleeve 3 the same can also be arranged within the gear 2 as illustrated in Figs. 3 and 4. In this instance a greater number of springs can be used and the ring 9 is provided with outwardly directed kerfs 10 locking it against shift with relation to the gear 2.

If the spindle 1 is arrested for any reason the sleeve 3 with the actuating shaft further rotates whereas the gear 2 is loosely sliding on sleeve 3. It is thus not necessary to stop the whole machine and not possible that spindle breakage or other damage can be caused.

What I claim as my invention is:

An actuating mechanism of the kind specified comprising an annular spindle actuating worm gear member, a sleeve member on which the said worm gear member is mounted for rotation, an intermediate friction producing member between the peripheries of both members, the said sleeve member constituting a lateral guiding and supporting flange for the said worm gear member at the one side thereof and the one of the two members constituting laterally open and radial spring seating recesses, springs within the said recesses and acting with their ends on the said friction producing member so as to produce friction between both members whereby the worm gear may be carried around by the said sleeve member upon rotation thereof, and a lateral disc detachably mounted on the said sleeve member for laterally closing the spring seating recesses and constituting a guiding and supporting flange for the worm gear member at the other side thereof.

In testimony whereof I have affixed my signature.

JOHANN JACOB KEYSER.